(12) United States Patent
Fornaciari (10) Patent No.: US 11,777,381 B2
(45) Date of Patent: Oct. 3, 2023

(54) ELECTRIC MACHINE

(71) Applicant: Dana Motion Systems Italia S.R.L., Reggio Emilia (IT)

(72) Inventor: Felice Fornaciari, Reggio Emilia (IT)

(73) Assignee: Dana Motion Systems Italia S.R.L., Reggio Emilia (IT)

( * ) Notice: Subject to any disclaimer, the term of this patent is extended or adjusted under 35 U.S.C. 154(b) by 157 days.

(21) Appl. No.: 17/123,006

(22) Filed: Dec. 15, 2020

(65) Prior Publication Data

US 2021/0194334 A1 Jun. 24, 2021

(30) Foreign Application Priority Data

Dec. 20, 2019 (EP) ................................. 19218455

(51) Int. Cl.
| | |
|---|---|
| *H02K 3/50* | (2006.01) |
| *H02K 15/00* | (2006.01) |
| *H02K 3/52* | (2006.01) |
| *H02K 5/22* | (2006.01) |

(52) U.S. Cl.
CPC .......... *H02K 15/0062* (2013.01); *H02K 3/50* (2013.01); *H02K 3/52* (2013.01); *H02K 5/225* (2013.01); *H02K 2203/06* (2013.01)

(58) Field of Classification Search
CPC ...... H02K 3/52; H02K 15/0062; H02K 5/225; H02K 3/50
See application file for complete search history.

(56) References Cited

U.S. PATENT DOCUMENTS

| | | | | |
|---|---|---|---|---|
| 4,547,689 A | * | 10/1985 | Tsuchimoto | ........... H02K 5/225 310/71 |
| 6,628,023 B1 | * | 9/2003 | Paquet | ...................... H02K 3/38 310/260 |
| 6,825,586 B2 | * | 11/2004 | Edrington | .............. H02K 5/225 310/71 |
| 8,373,318 B2 | * | 2/2013 | Patel | ...................... H02K 3/527 310/71 |
| 10,320,257 B2 | | 6/2019 | Koiwai et al. | |
| 2012/0070321 A1 | * | 3/2012 | Cho | ........................ H02K 1/185 417/410.1 |

FOREIGN PATENT DOCUMENTS

DE 10327960 A1 1/2005

OTHER PUBLICATIONS

European Patent Office, Extended European Search Report Issued in Application No. 19218455.4, dated Jun. 17, 2020, Germany, 7 pages.

* cited by examiner

*Primary Examiner* — Leda T Pham
(74) *Attorney, Agent, or Firm* — McCoy Russell LLP

(57) ABSTRACT

An electric machine, comprising: a housing enclosing an inner space, a stator and a rotor disposed in the inner space, an axis of rotation of the rotor defining an axial direction. The housing comprises an end wall extending transverse to the axial direction and closing the inner space in the axial direction. A separator element disposed in between the stator and the end wall along the axial direction, and the separator element delimiting a volume within the inner space for receiving an electrical conductor within said volume.

13 Claims, 6 Drawing Sheets

ELECTRIC MACHINE

CROSS-REFERENCE TO RELATED APPLICATION

The present application claims priority to European Patent Application No. 19 218 455.4, entitled "ELECTRIC MACHINE", and filed on Dec. 20, 2019. The entire contents of the above-listed application are hereby incorporated by reference for all purposes.

TECHNICAL FIELD

The present document relates to an electric machine, in particular to an electric machine comprising a separator element for separating one or more electric conductors from a rotor of the machine. Electric machines of the presently proposed type may be used in but are not limited to the field of hydraulics.

BACKGROUND AND SUMMARY

Electric machines such as electric motors or generators typically include a stator and a rotor. The stator usually comprises a plurality of windings made of an electrically conductive material such as copper. The rotor usually comprises a magnet, for instance a permanent magnet or an electromagnet. In an electric motor, applying a voltage to the stator windings in an appropriate manner produces electric currents in the stator windings. These then generate electromagnetic fields which cause the rotor to rotate. In this way, electric energy may be converted into mechanical energy. By contrast, in an electric generator, a rotating magnet may induce voltages and electric currents in the stator windings, thereby converting mechanical energy into electric energy.

However, providing an electrical connection between the stator windings and a power source or an energy storage device that is safe, reliable and easy to set up has often proved to be a challenging task.

For example, U.S. Ser. No. 10/320,257B2 discloses an electric motor comprising a rotor, a stator, a housing, an opening for opening a storage space, a notch that is concaved downward from an edge surface surrounding the opening, a lead wire connected to the stator, and a partition wall that is provided on the inside of the notch in order to separate a sealing space for injecting a sealant and a space outside the sealing space from each other and that has a through-hole for allowing the lead wire to be extended to the outside of the sealing space. The motor further comprises a cover that can be attached to the housing from above and an elastic member which is more elastic than the partition wall and disposed under the partition wall. An end surface of the partition wall is disposed on or above a plane surface including the edge surface of the housing.

However, there continues to be demand for an electric machine that can be assembled preferably easily and at low cost and that can be operated preferably safely and reliably.

The presently proposed electric machine comprises:
a housing enclosing an inner space,
a stator and a rotor disposed in the inner space, an axis of rotation of the rotor defining an axial direction, wherein the housing comprises an end wall extending transverse to the axial direction and closing the inner space in the axial direction, and
a separator element disposed in between the stator and the end wall along the axial direction, the separator element delimiting a volume within the inner space for receiving an electrical conductor within said volume, wherein said volume is disposed in between the separator element and the end wall along the axial direction and wherein the separator element is shaped to separate the volume from the rotor.

The fact that volume delimited by the separator element within the inner space is configured to receive an electrical conductor within said volume and that the separator element is shaped to separate the volume from the rotor allows one or more electrical conductors which may be connected to the stator to be protected from the rotor during operation of the electrical machine. And the fact that said volume is disposed in between the separator element and the end wall along the axial direction facilitates assembly of the electric machine with respect to electric machines known from the prior art.

The housing typically comprises a side wall extending along the axial direction and closing or enclosing the inner space perpendicular to the axial direction. For example, the side wall may extend in parallel to the axial direction, or the side wall may be slightly inclined with respect to the axial direction. In most cases, the side wall encloses an angle between 0° and less than 10° or less than 5° with the axial direction. The side wall may have a circular, oval, rectangular, quadratic or polygonal cross section perpendicular to the axial direction. However, it is understood that the cross section of the side wall perpendicular to the axial direction may have other shapes.

The side wall may also taper or at least partially taper along the axial direction and toward the end wall. For instance, the side wall may be configured such that a cross section or a cross sectional area of the inner space perpendicular to the axial direction is constant or decreases at least in sections or continuously along the axial direction and toward the end wall. This may further facilitate installing the separator element in the inner space of the housing.

The end wall and the side wall of the housing may be formed in one piece. However, it is also conceivable that the end wall and the side wall are formed as separate pieces which are connected to one another, for example through connecting means such as screws or bolts.

The volume formed or at least partially formed by the separator element may further be delimited by the end wall, by the side wall, or by the end wall and the side wall. The separator element may rest against the side wall or may abut the side wall. In particular, the separator element may rest against or abut the side wall in two or more lateral directions perpendicular to the axial direction, in particular on laterally opposing sides of the side wall. In this way, the separator element may be laterally fixed by the side wall or in between different sections of the side wall.

The separator element may comprise first fixing elements and the housing comprises second fixing elements. For example, the first fixing elements may comprise one or more protrusions protruding from the separator element, in particular along the axial direction. Additionally or alternatively, the first fixing elements may comprise one or more notches or indentations formed in the separator element. Similarly, the second fixing elements may comprise one or more protrusions protruding from the housing. For example, the second fixing elements may comprise protrusions protruding from the end plate in the axial direction and/or protruding from the side wall perpendicular to the axial direction. Additionally or alternatively, the second fixing elements may comprise one or more notches or indentations formed in the housing, for example in the end wall and/or in the side wall. The first fixing elements and the second fixing elements may then cooperate to prevent rotation of the separator element with respect to the axis of rotation. For example, the first and the second fixing elements may engage one another in a form fit.

The separator element may comprise a first separator portion and a second separator portion. The first separator portion may extend laterally or in a lateral plane perpendicular to the axial direction. The first separator portion may rest against the side wall or may abut the side wall, for example in one or more lateral directions perpendicular to the axial direction. The first separator portion may have a plate-like or disc-like shape. The second separator portion may extend axially from the first separator portion. The second separator portion may rest against or may abut the end wall in the axial direction. The volume formed or delimited by the separator element may be formed in between the first separator portion and the second separator portion. Or in other words, the volume formed or delimited by the separator element may be delimited by the first separator portion and the second separator portion. The first separator portion and the second separator portion may be formed in one piece. However, it is understood that the first separator portion and the second separator portion may be formed as separate pieces which are connected to one another, for example by adhesive bonding, welding, soldering, or the like.

The separator element may have an annular shape or the shape of a circular sector. In particular, the first separator portion may have an annular shape or the shape of a circular sector. The second separator portion may have a cylindrical shape or the shape of a hollow cylinder or the shape of a sector of a hollow cylinder. The second separator portion may at least partially or completely surround a central bore or a central opening of the first separator portion. The rotor may then pass through the separator element, in particular through the central bore or through the central opening of the first separator portion.

The electric machine may comprise one or more first electrical conductors electrically connected to the stator. The separator element may then comprise a recess or a through hole, and the one or more first electrical conductors may reach through the recess or through the through hole of the separator element and into the volume delimited by the separator element. That is, the one or more first electrical conductors may be received or at least partially received in the volume delimited by the separator element where they are separated and protected from the rotor of the electrical machine.

The housing, in particular the end wall or the side wall, may comprise or feature an opening or a through hole in communication with said volume delimited by the separator element. One or more electrical conductors may then reach or be led through the opening or through hole in the housing, for example from the volume within the housing to an outside of the housing, or from the outside of the housing into the cable channel.

The electric machine may comprise one or more cable glands configured to be received or removably received in the opening or through hole of the housing. For example, an outer surface of the cable gland and an inner surface of the opening or through hole of the housing may feature corresponding threads so that the cable gland can be screwed into the opening or through hole of the housing. The cable gland may comprise a cable channel extending through the cable gland such that when the cable gland is received in the opening or in the through hole of the housing, one or more cables or other electrical conductors may reach through the cable channel of the cable gland, for example from the volume within the housing to an outside of the housing, or from the outside of the housing into the cable channel.

The above-mentioned first electrical conductor may comprise one or more cables or one or more flexible wires. The one or more cables or flexible wires may be long enough to reach through the opening of the housing to be connected with one or more second electrical conductor outside of the housing. This way the stator may be electrically connected with a power supply or with a storage device such as a battery via the first electrical conductor and the second electrical conductor.

Further, a method of assembling the previously described electric machine is presently proposed. The method comprises the steps of:

disposing the separator element inside the space of the housing to form said volume delimited by the separator element;

disposing at least the stator inside the inner space; and passing a first electrical conductor electrically connected to the stator through a recess or through a through hole of the separator element and into said volume.

The method may further comprise:

passing the first electrical conductor from said volume through an opening or a through hole in the housing, in particular in the end wall or in the side wall, to an outside of the housing to allow the first electrical conductor to be connected to a second electrical conductor outside of the housing.

And the method may comprise:

connecting the first electrical conductor with a second electrical conductor outside of the housing; and, subsequently, passing the first electrical conductor and a first portion of the second electrical conductor connected with the first electrical conductor through the opening or the through hole in the housing and into said volume while leaving a second portion of the second electrical conductor outside of the housing to allow the stator of the electrical machine to be connected to a power supply or to an energy storage such as a battery via the first electrical conductor and the second electrical conductor.

BRIEF DESCRIPTION OF THE FIGURES

An embodiment of the presently proposed electric machine is described in the following detailed description and depicted in the Figures in which FIG. 1 schematically shows a sectional view of an electric machine including a separator element, FIG. 2A schematically shows a perspective view of the separator element of FIG. 1 according to a first embodiment, FIG. 2B schematically shows a perspective view of the separator element of FIG. 1 according to a second embodiment, and FIGS. 3A-D schematically shows sectional views of the electric machine of FIG. 1 during assembly of the electric machine.

FIGS. 1-3D are shown approximately to scale.

DETAILED DESCRIPTION

Figure 1:
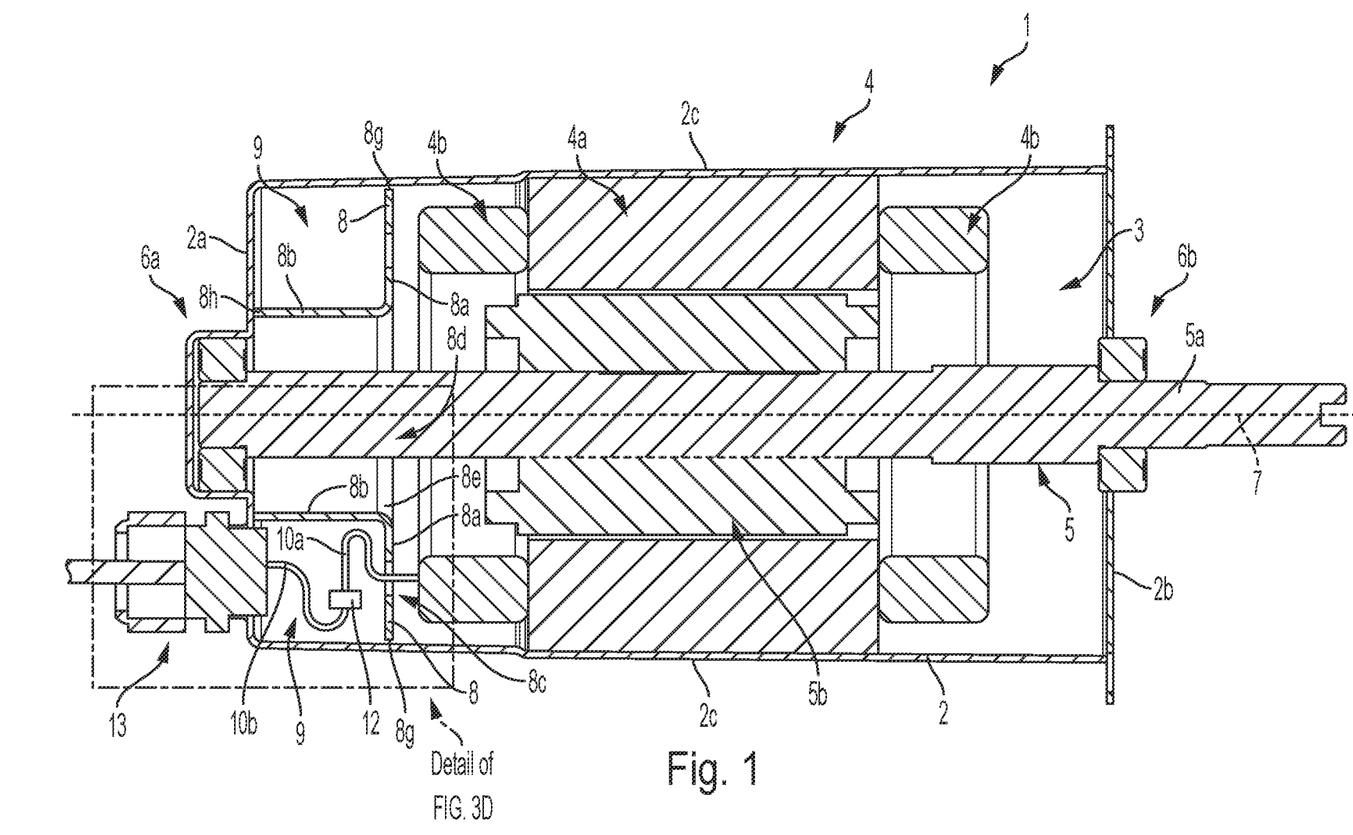

FIG. 1 shows an electric machine 1 of the presently proposed type. The electric machine 1 may be configured as or may comprise an electric motor or an electric generator. For example, the electric machine 1 may be configured as or may comprise an AC motor such as an induction motor, a DC motor, or a universal motor. The electric machine 1 comprises a housing 2 including a first end wall 2a, a second end wall 2b, and a side wall 2c. In the embodiment depicted in FIG. 1 the housing 2 has a cylindrical or essentially cylindrical shape. However, it is understood that the housing 2 may have other shapes. The housing may be made of a non-magnetic or non magnetisable material such as plastic. However, it is understood that the housing 2 may be made of or may comprise other materials. The housing 2 encloses an inner space 3 and houses a stator 4 and a rotor 5 which are disposed or installed within the inner space 3. The stator 4 is stationary with respect to the housing 2, while the rotor 5 may rotate with respect to the housing 2 and with respect to the stator 4.

The rotor 5 comprises a shaft 5a and a magnetic or magnetisable element 5b such as a permanent magnet or an electromagnet. The magnet or magnetisable element 5b is fixedly mounted on the shaft 5a. The shaft 5a is rotatably mounted in or on the housing 2 by means of bearings 6a, 6b. In the embodiment depicted in FIG. 1 the bearings 6a, 6b are disposed or mounted on the end walls 2a, 2b of the housing 2. An axis of rotation 7 of the rotor 5 defines an axial direction. In FIG. 1 the axis of rotation 7 of the rotor 5 coincides with a symmetry axis of the essentially cylindrical housing 2.

The end walls 2a, 2b of the housing 2 extend perpendicular to the axial direction and close or enclose the inner space 3 in the axial direction 7. The side wall 2c extends in parallel or essentially in parallel to the axial direction 7. Here, the side wall 2c has the shape or essentially the shape of a cylinder barrel. However, it is understood that the side wall 2c may have other shapes. In the embodiment depicted in FIG. 1 the side wall 2c slightly tapers towards the first end wall 2a along the axial direction 7 such that in a plane including the axis of rotation 7 the side wall 2c is slightly inclined with respect to the axis of rotation 7 and encloses an angle of less than 10 degrees or of less than 5 degrees with the axis of rotation 7. As a consequence, an area of the circular or essentially circular cross section of the inner space 3 perpendicular to the axial direction 7 is essentially constant or slightly decreases along the axial direction 7 and toward the first end wall 2a. This may facilitate assembly of the electric machine 1. In FIG. 1 the first end wall 2a and the side wall 2c are formed in one piece. However, it is understood that in alternative embodiments the first end wall 2a and the side wall 2c may be formed as separate pieces that are connected or bonded to one another.

The stator 4 is arranged concentrically or essentially concentrically with respect to the axis of rotation 7. The stator 4 comprises plate-like laminations 4a which are arranged perpendicular to the axis of rotation 7, and a plurality of windings 4b such as copper windings which are wrapped around the laminations 4a. In the embodiment depicted in FIG. 1 the windings 4b extend beyond the laminations 4a at both ends along the axial direction 7. It must be emphasized that for ease of illustration the laminations 4a and the windings 4b are depicted merely schematically in FIG. 1. The stator including the laminations 4a and the windings 4b is disposed around the rotor 5. The rotor 5, and in particular the shaft 5a, reaches through the stator 4.

The electric machine 1 further comprises a separator element or separator 8 disposed within the inner space 3, and at least one electric conductor such as at least one cable or wire 10a connected to the stator 4, in particular to the stator windings 4b. For ease of illustration only, a single cable 10a is shown in the Figures. However, it is understood that the cable 10a may generally comprise one, two, three or more cables or wires. The separator 8 is preferably made of or comprises a non-conductive material such as plastic. However, it is understood that the separator 8 may be made of or may comprise other materials. The separator 8 is disposed in between the stator 4 and the first end wall 2a along the axial direction 7. The separator 8 forms or delimits a volume or chamber 9 within the inner space 3 enclosed by the housing 2. The volume 9 is configured to receive one or more electrical conductors such as the cables 10a and to separate and to protect the one or more electrical conductors received inside the volume 9 from or against the rotor 5. The cables 10a connected to the stator 4 may reach into the volume or chamber 9 formed by the separator 8 through a recess or through hole 8c formed in the separator 8. Via the flexible cables 10a the stator 4 can be connected to a power source or to an energy storage device such as a capacitor, a rechargeable battery, or the like.

The housing 2 has an opening or through hole 11 which is in communication with the volume or chamber 9 so that an electrical conductor such as the cables 10a disposed or received within the volume 9 can reach from the volume 9 through the opening or through hole 11 to an outside of the housing 2, or vice versa. In this way, the cables 10a may be used to electrically connect the stator 4, in particular the stator windings 4b, with a power source or with an energy storage device. It is particularly advantageous if the cables 10a which are directly connected to the stator 4 have a length that is sufficient for the cables 10a to be passed through the opening or through hole 11 and to the outside of the housing where they may be connected with a second set of cables 10b, as will be explained in some more detail further below. For example, the length of the first cables 10a may be at least twice, at least three times, or at least four times a shortest distance between the stator 4 and the opening or through hole 11. In the embodiment of the electric machine 1 shown in FIG. 1 the opening or through hole 11 is formed in the end wall 2a of the housing 2. However, it is understood that the opening or through hole 11 may likewise be formed in the side wall 2c.

The electric machine 1 further comprises a cable gland 13 which is removably or releasably received in the opening or through hole 11 of the housing. The cable gland 13 may be made of a waterproof material such as plastic. However, it is understood that the cable gland 13 may be made of or may comprise other materials. The cable gland 13 is configured and shaped to seal and close the opening 11 in a waterproof manner in order to prevent water and/or moisture from entering into the inner space 3, and in particular from entering into the volume or chamber 9. For example, a portion of the housing 2 delimiting the opening or through hole 11 and an outer surface of the cable gland 13 may have corresponding threads so that the cable gland 13 may be removably screwed into the opening or through hole 11 of the housing. The cable gland 13 has a cable channel 14 which extends through the cable gland 13 so that one or more electrical conductors such as the cables 10a, 10b may reach through the cable gland 13 when the cable gland 13 is received in the opening or through hole 11.

Figure 2A:
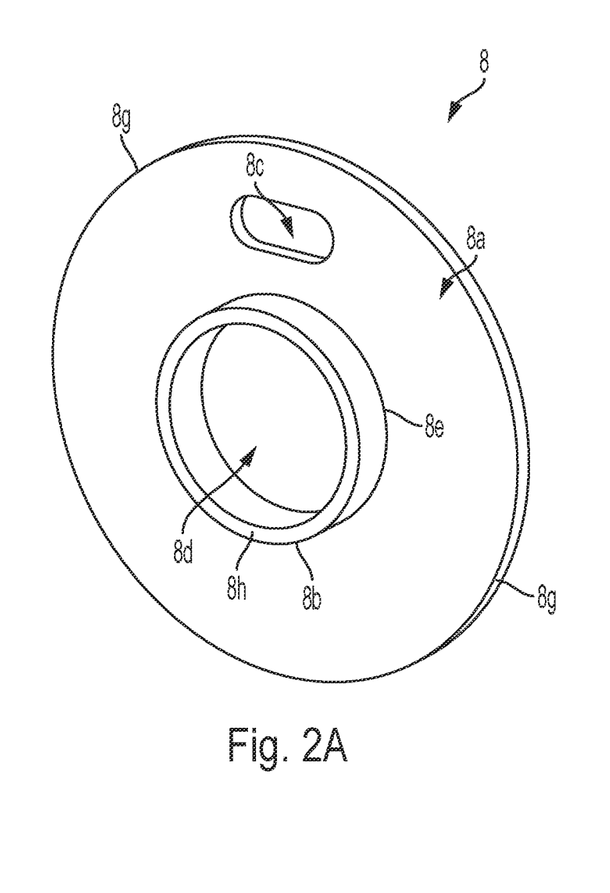
Figure 2B:
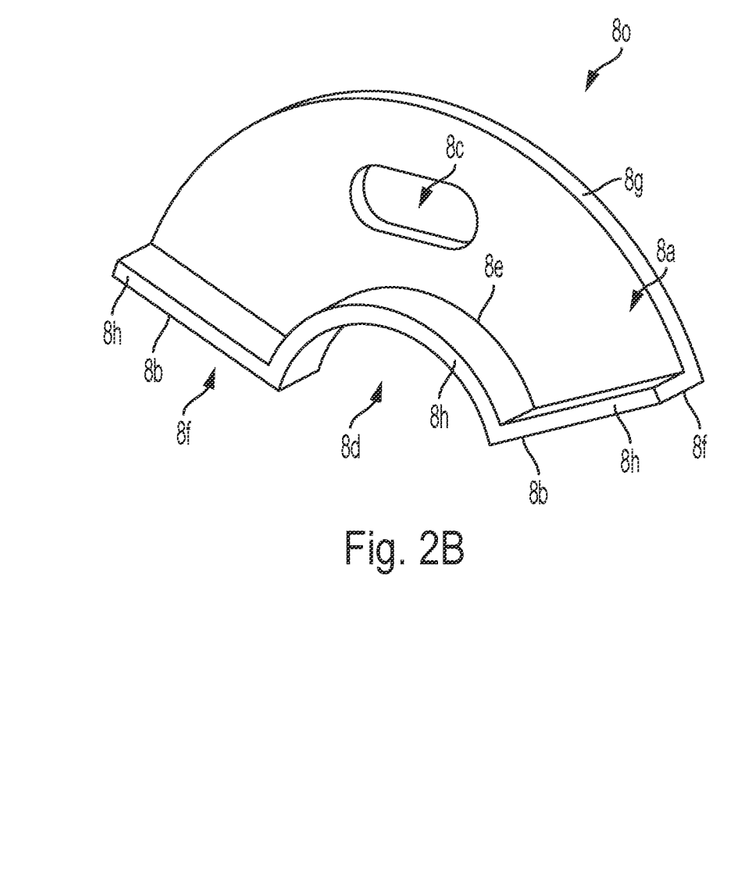

A perspective view of the separator 8 of FIG. 1 is schematically illustrated in FIG. 2A. FIG. 2B shows a perspective view of a separator 80 which is a variation of the separator 8 of FIG. 2A and which may replace the separator 8 of the electric machine 1 of FIG. 1. Throughout this document the same or corresponding features recurring in different Figures are designated with the same reference signs.

The separators 8, 80 have a first plate-like portion 8a which is arranged or extends perpendicular or essentially perpendicular to the axial direction 7. The first separator portion 8a is disposed in between the stator 4 and the first end wall 2a of the housing 2 along the axial direction 7. The first separator portion 8a closes or delimits the volume 9 in the axial direction 7, in particular towards the stator 4. The first separator portion 8a separates the volume 9 from the stator 4. As mentioned above, the first separator portion 8a has a through hole or recess 8c, which allows the cables 10a which are electrically connected to the stator windings 4b to reach through the through hole or recess 8c and into the volume or chamber 9.

The separators 8, 80 further have a second portion 8b which extends from the first separator portion 8a. In the embodiments depicted in the Figures, the second separator portion 8b extends from the first separator portion 8a in parallel or essentially in parallel to the axial direction 7 and towards the first end wall 2a of the housing 2. That is, in the embodiments depicted in the Figures the second separator portion 8b extends from the first separator portion 8a at an angle of 90 degrees or of essentially 90 degrees. The second separator portion 8b is disposed in between the side wall 2c and the rotor 5. The second separator portion 8b closes or delimits the volume 9 in one or more directions perpendicular to the axial direction 7, in particular towards the rotor 5. The second separator portion 8b separates the cables 10a disposed in the volume 9 from the rotor 5 and protects them against the rotor 5.

The volume 9 is further delimited by the first end wall 2a and by the side wall 2c of the housing 2. In other words, the volume or chamber 9 is formed in between the end wall 2a, the side wall 2c and the separator portions 8a, 8b. The walls 2a, 2c and the separator 8 close or essentially close the volume 9 on all sides. The separator portions 8a, 8b may be formed in one piece. However, it is likewise conceivable that the separator portions 8a, 8b are formed as separate pieces which are connected or bonded to one another, for example by adhesive bonding, welding or the like.

FIG. 2A illustrates that the separator 8 and in particular the first separator portion 8a may have an annular shape. More specifically, in FIG. 2A the first separator portion 8a has a disc-like shape that features a central bore or clearance 8d. The central bore or clearance 8d may have a circular shape. However, it is understood that the central bore or clearance 8d may have other shapes. For example, the central bore or clearance 8d may be configured to receive the shaft 5a of the rotor 5 so that the shaft 5a may pass through or reach through the separator 8. FIG. 2A further illustrates that the second separator portion 8b may have a cylindrical or essentially cylindrical shape, for example the shape of a cylinder barrel. In the embodiment depicted in FIG. 2A the second separator portion 8b completely surrounds or encircles the central bore or clearance 8d and extends from an edge or rim 8e enclosing and delimiting the central bore or clearance 8d. The second separator portion extends toward the first end wall 2a of the housing 2 in the axial direction 7. In this manner, the second separator portion 8b according to FIG. 2A completely surrounds and encloses the rotor shaft 5a. Thus, in FIG. 2A the volume or chamber 9 formed and delimited by the separator 8 and the walls 2a, 2c has a ring-like or torus-like shape.

As mentioned before, the separator 80 depicted in FIG. 2B is a variation of the separator 8 depicted in FIG. 2A. In FIG. 2B the first separator portion 8a of the separator 80 has the shape of a circular sector and does not completely surround the rotor shaft 5a. In FIG. 2B, too, the first separator portion 8a of the separator 80 has a clearance 8d for receiving or at least partially receiving the rotor shaft 5a.

And in FIG. 2B the second separator portion 8b extends from an outer edge or rim 8f of the first separator portion 8a and toward the first end wall 2a of the housing 2. In this way, the separator 80 according to FIG. 2B and the walls 2a, 2c of the housing 2 close or essentially close the volume or chamber 9 on all sides and effectively protect the cables 10a, 10b received or disposed within the volume 9 against the rotor 5, in particular against the rotor shaft 5a.

Both separators 8, 80 depicted in FIGS. 2A and 2B are configured or shaped such that an outer edge 8g of the first separator portion 8a rests against or abuts the side wall 2c of the housing 2 perpendicular to the axial direction 7, in particular in more than one direction perpendicular to the axial direction 7. More specifically, the separators 8, 80 are shaped such that the outer edge 8g of the first separator portion 8a rests against or abuts the side wall 2c along more than one radius vector pointing outward from the rotation axis 7 of the rotor 5 and toward the side wall 2c in different directions perpendicular to the axial direction 7. In this manner, the side wall 2c of the housing 2 may completely or at least partially enclose the separator 8, 80 in a form fit to fix or secure the separator 8, 80 with respect to the housing 2 and with respect to the rotation axis 7 in one or more directions perpendicular to the axis of rotation 7. For example, the cylinder shape side wall 2c of the electric machine 1 depicted in FIG. 1 completely encloses the circular outer edge 8g of the separator 8 of FIG. 2A in a plane perpendicular to the axial direction 7. Furthermore, both separators 8, 80 depicted in FIGS. 2A and 2B are configured or shaped such that an axial end 8h of the second separator portion 8b facing the end wall 2a rests against or abuts the end wall 2a in the axial direction 7.

Both separators 8, 80 depicted in FIGS. 2A and 2B are configured or shaped such that the second separator portion 8b or at least a portion thereof is disposed at a distance from the side wall 2c and/or from the outer edge 8g of the separator 8, 80 which rests against or abuts the side wall 2c. Said distance between the second separator portion 8b or a portion thereof and the side wall 2c is defined by the first separator portion 8a, in particular by a portion of the first separator portion 8a extending perpendicular to the axial direction 7. Similarly, the first separator portion 8a or at least a portion thereof is disposed at a distance from the first end wall 2a and/or from the axial end 8h of the separator 8, 80 which rests against or abuts the first end wall 2a. Said distance between the first separator portion 8a or a portion thereof and the first end wall 2a is defined by the second separator portion 8b, in particular by a portion of the second separator portion 8b extending in parallel to the axial direction 7.

FIGS. 3A-D show consecutive steps of assembling the electric machine 1 depicted in FIG. 1. In FIG. 1 the detail of the electric machine 1 of FIG. 1 which is shown in FIGS. 3A-D is highlighted by a dashed rectangle.

Figure 3A:
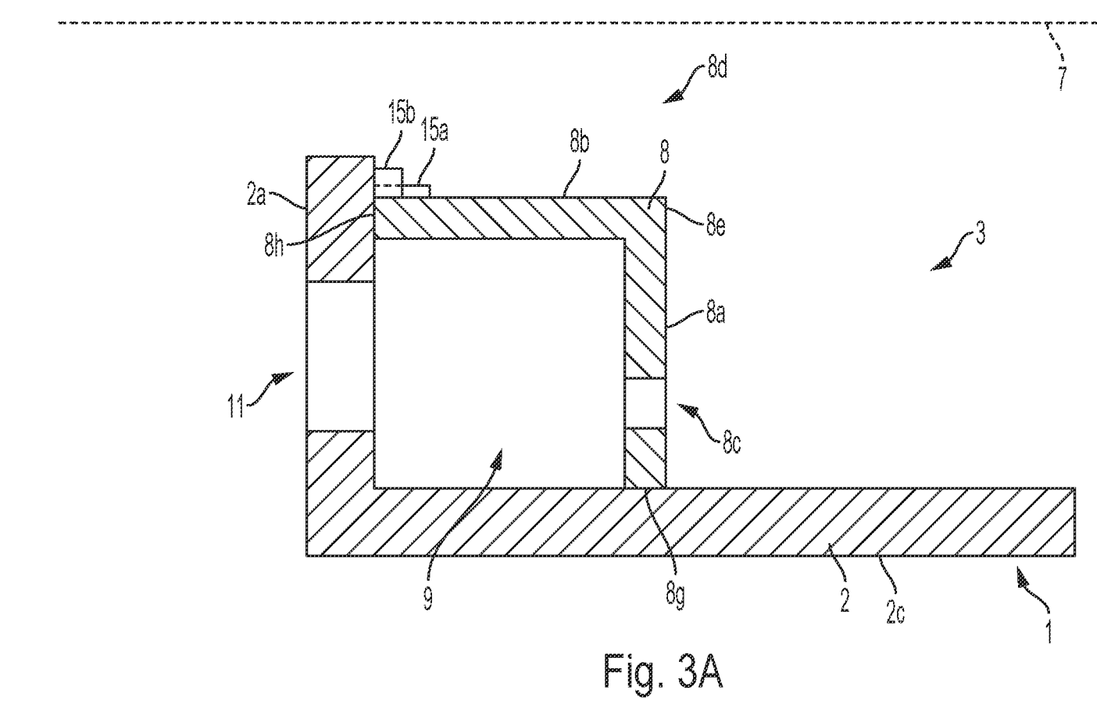

In a first step depicted in FIG. 3A, the separator 8 is inserted or installed inside the housing 2. The fact that the side wall 2c of the housing is arranged in parallel to the axial direction 7 or slightly tapers toward the first end wall 2a along the axial direction 7 advantageously facilitates the installation of the separator 8 inside the housing 2. FIGS. 3A-D further show that the separator 8 and the housing 2 may feature corresponding first and second fixing elements 15a and 15b, respectively. The fixing elements 15a, 15b may be configured as protrusions protruding from the separator 8 and from the housing 2, for example. For instance, the first fixing element 15a of the separator 8 may extend from the second separator portion 8b in a direction perpendicular to the axial direction 7, and the second fixing element 15b of the housing 2 may extend from the first end wall 2a in the axial direction 7 and toward the inside of the housing 2. The fixing elements 15a, 15b may be formed in one piece with the separator 8 and/or with the housing 2, or they may be separate from the separator 8 and/or from the housing 2 but fixedly connected to the separator 8 and to the housing 2, respectively. When the separator 8 is installed inside the housing 2, as shown in FIG. 1 and in FIGS. 3A-D, the fixing elements 15a, 15b cooperate or engage one another in such a way that they prevent or restrict rotation of the separator 8 with respect to the axis of rotation 7.

Figure 3B:
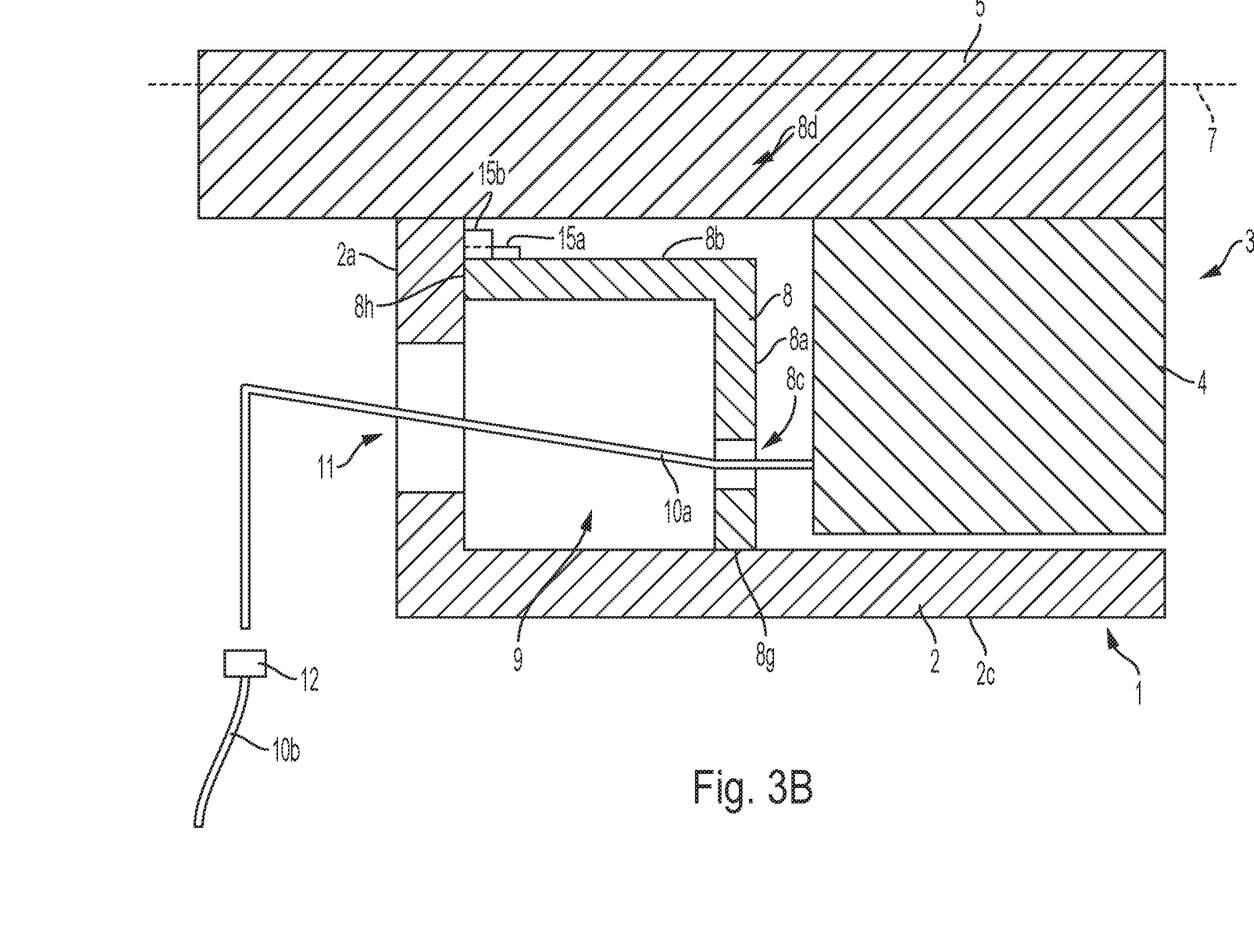

In a second step depicted in FIG. 3B, the stator 4 and the rotor 5 are installed or mounted in or on the housing 2. The sequence of installing or mounting the stator 4 and the rotor 5 may be chosen based on the specific layout of the housing 2, the stator 4 and the rotor 5. Once the stator 4 has been installed, the cables 10a connected to the stator 4 are passed through the recess or through hole 8c of the separator 8 and into the volume 9 formed between the separator 8, the first end wall 2a and the side wall 2c. From the volume 9, the cables 10a are then passed through the opening 11 in the housing 2 to an outside of the housing 2 where they are electrically connected with a second set of flexible cables 10b through connecting means which may include one or more connecting sleeves 12, for example. The second set of cables 10b may be connected with a power source or with an energy storage device such as a capacitor, a rechargeable battery, or the like.

Figure 3C:
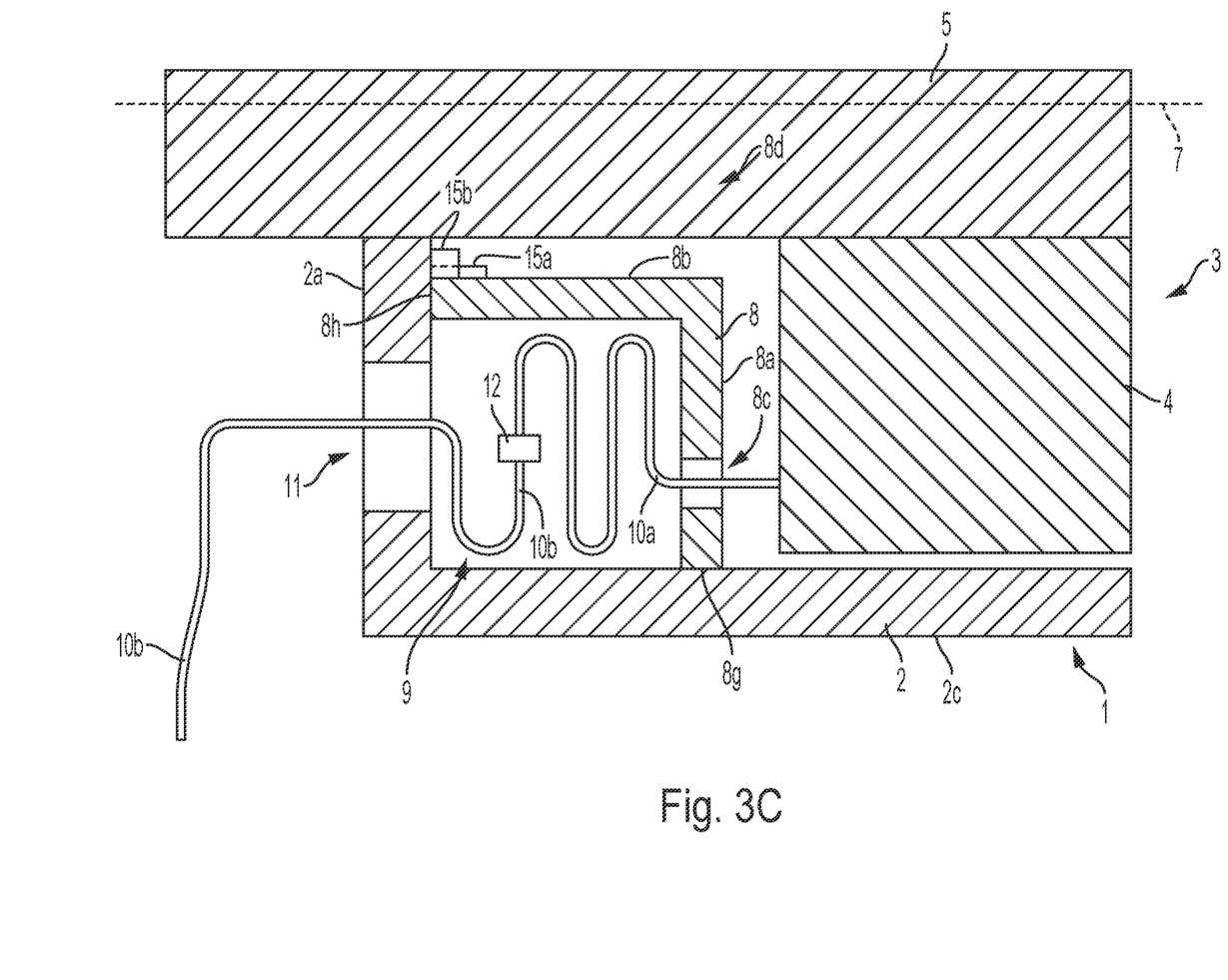

In a third step depicted in FIG. 3C, the cables 10a, which are connected to the cables 10b through the connecting sleeve 12, are again passed through the opening 11 of the housing and into the volume 9 formed and/or delimited by the separator 8. When the cables 10a, 10b are disposed inside the volume 9 the separator 8 securely separates them from the rotor 5 and protects them against the rotor 5.

Figure 3D:
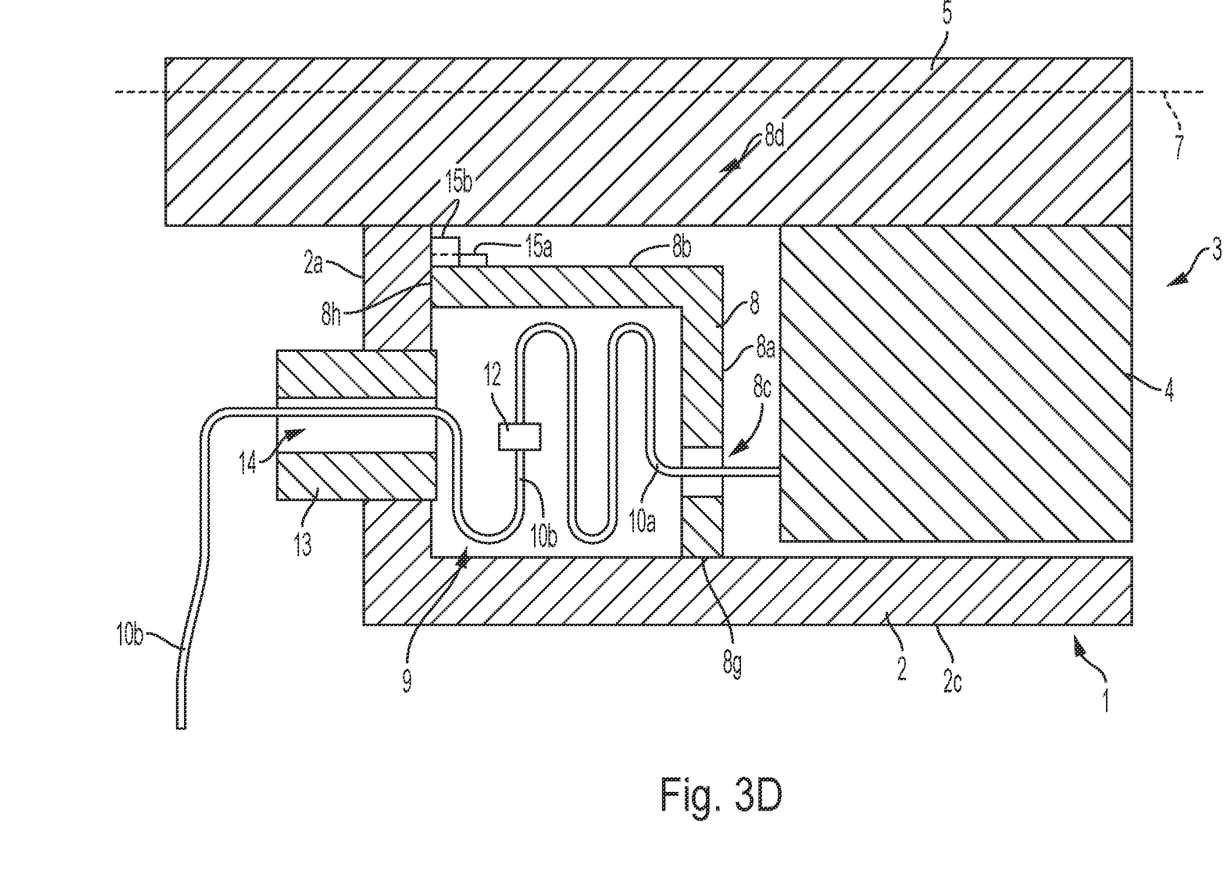

In a fourth step depicted in FIG. 3D, the cable gland 13 is screwed or otherwise mounted in the opening 11 of the housing 2, thereby sealing the inner space 3 of the housing 2, and in particular the volume 9 formed and/or delimited by the separator 8 from the outside of the housing, thereby preventing water and/or moisture from entering into the inner space 3 and into the volume 9.

A person of ordinary skill can appreciate that the electric machine 1 can be produced and assembled in a particularly simple and cost efficient manner, and that due to the protection of the cables 10a, 10b against the rotor 5 provided by the separator 8 it may be operated particularly safely and reliably.

FIGS. 1-3D show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric machine, comprising:
    a housing enclosing an inner space which is hollow,
    a stator and a rotor disposed in the inner space, an axis of rotation of the rotor defining an axial direction, wherein the housing comprises an end wall extending transverse to the axial direction and closing the inner space in the axial direction and a longitudinal wall, and
    a separator element disposed in the inner space in between the stator and the end wall along the axial direction, the separator element forming a volume which is hollow and delimited by the end wall, the longitudinal wall, a first separator portion extending radially from the longitudinal wall toward the rotor, and a second separator portion extending from the end wall toward the stator, and wherein the separator element is shaped to separate the volume from the rotor, and
    an electrical conductor passing from the stator through the inner space, through a hole in the separator element, and into the volume.

2. The electric machine of claim 1, further comprising a cable gland configured to be removably received in an opening of the housing, the cable gland comprising a cable channel extending through the cable gland to allow a cable to pass through the cable channel and into the volume delimited by the separator element, when the cable gland is received in the opening of the housing.

3. The electric machine of claim 1, wherein the separator element is a separate component from the housing inserted into the inner space within the housing, and the second separator portion extends in an arc around the rotor, wherein the first separator portion rests against the longitudinal wall in two or more lateral directions perpendicular to the axial direction on laterally opposing sides of the side wall to laterally fix the separator element with respect to the side wall.

4. The electric machine of claim 1, wherein the separator element comprises first fixing elements and wherein the housing comprises second fixing elements, wherein the first fixing elements and the second fixing elements cooperate to prevent rotation of the separator element with respect to the axis of rotation.

5. The electric machine of claim 1, wherein the first separator portion is shaped as at least a portion of a circular disk and the second separator portion is shaped as at least part of an annular collar which extends around the rotor.

6. The electric machine of claim 5, wherein the separator element is semi-circular and the second separator portion includes a section which extends radially outward from the annular collar to the longitudinal wall.

7. The electric machine of claim 5, wherein the separator element is circular and the circular disc and the annular collar completely surround the rotor.

8. The electric machine of claim 1, wherein the end wall comprises fixing elements which engage with fixing elements of the second separator portion.

9. The electric machine of claim 1, wherein the electrical conductor is a length to pass through the inner space, through the hole in the separator element, through the volume, and through an opening in the housing to an exterior of the housing.

10. A method of assembling the electric machine, the method comprising:
  disposing a separator element inside an inner space formed by an end wall and a longitudinal wall of a housing, the separator element forming a volume within the inner space, the volume delimited by the end wall, the longitudinal wall, a first separator portion extending radially from the longitudinal wall, and a second separator portion extending from the end wall;
  disposing at least a stator inside the inner space;
  passing an electrical conductor electrically connected to the stator through a hole of the separator element, into said volume, and out of an opening in the housing;
  connecting the electrical conductor positioned outside of the housing with a second electrical conductor; and
  passing the electrical conductor and a first portion of the second electrical conductor through the opening in the housing back into the volume.

11. The method of claim 10, further comprising positioning a cable gland within the opening in the housing.

12. The method of claim 10, further comprising fixing the separator element to the housing to prevent rotation.

13. The method of claim 10, wherein disposing the separator element within the inner space comprises engaging fixing elements of the separator element with fixing elements of the inner space.

* * * * *